Sept. 2, 1958 D. W. KRAYBILL 2,850,071
METHOD AND APPARATUS FOR STRETCH-FORMING METAL
AND CONTROLLING DIRECTION OF PULL
Filed Oct. 18, 1954 11 Sheets-Sheet 6
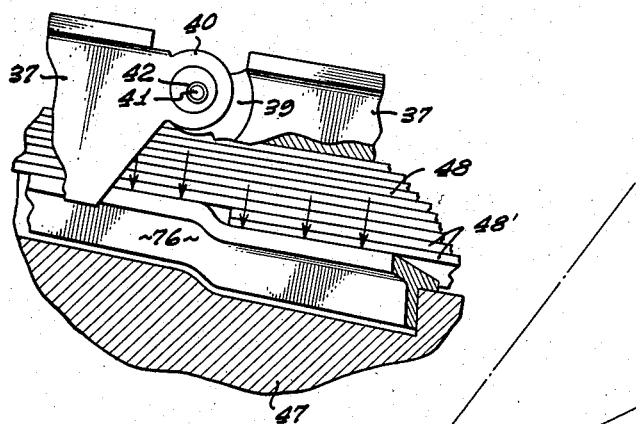
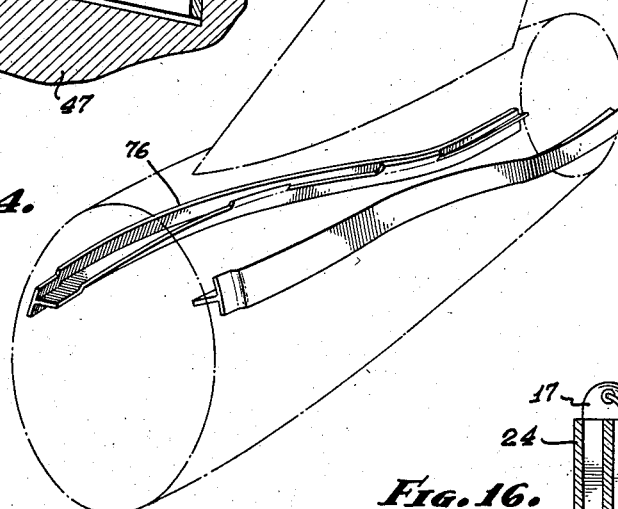
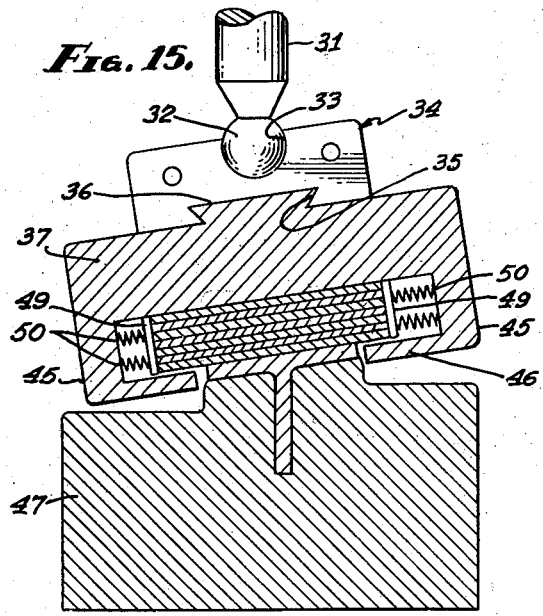
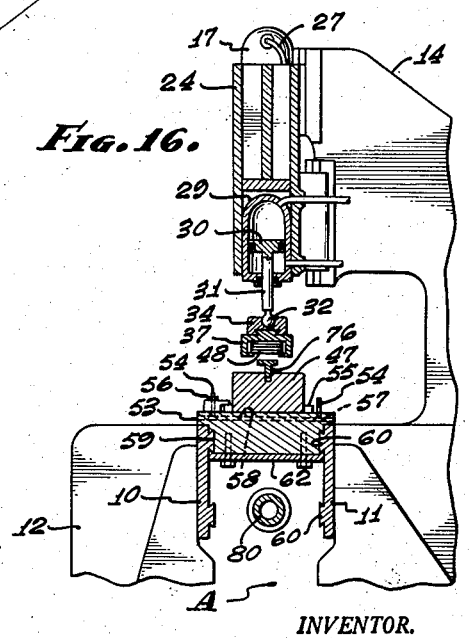
INVENTOR.
DANIEL W. KRAYBILL

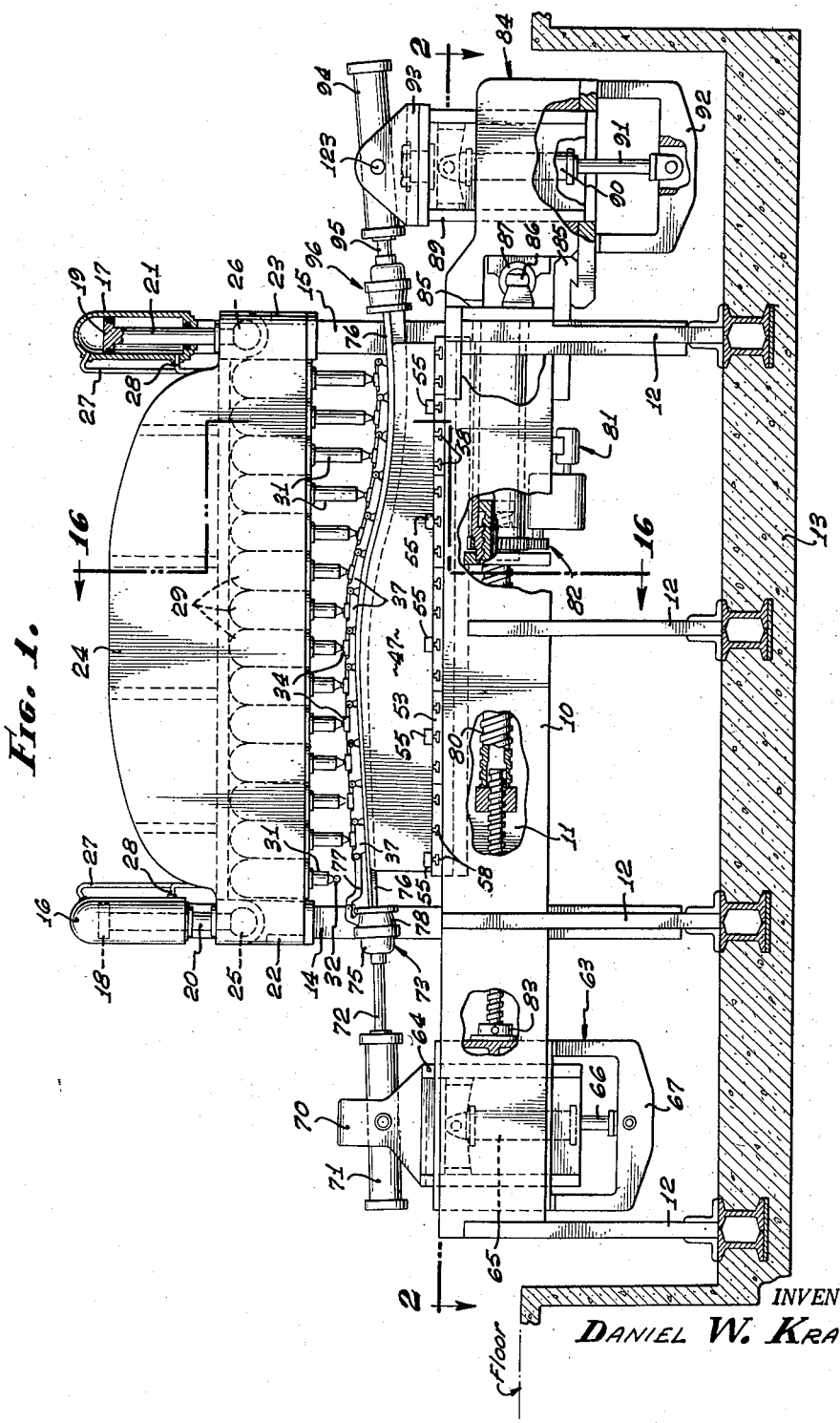

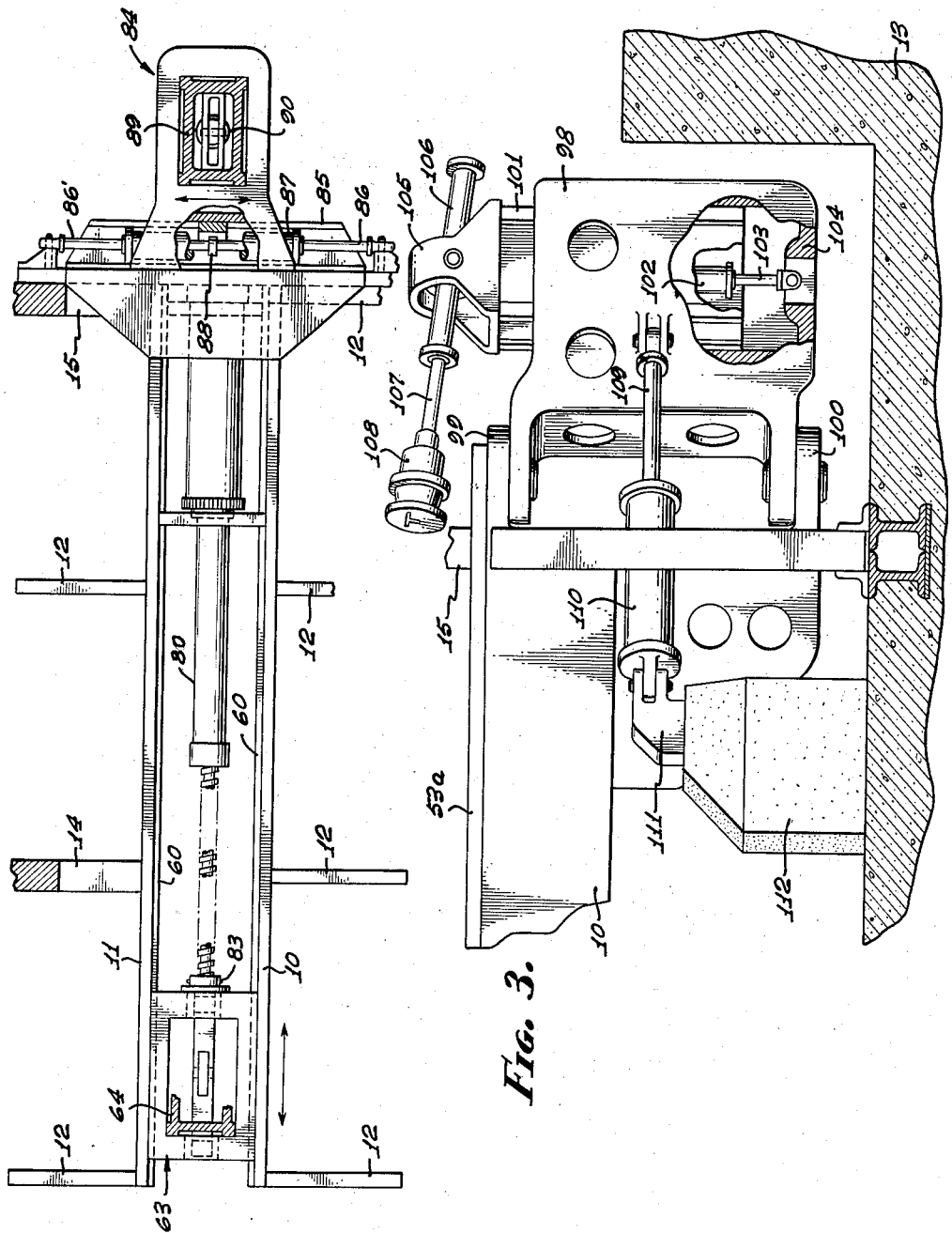

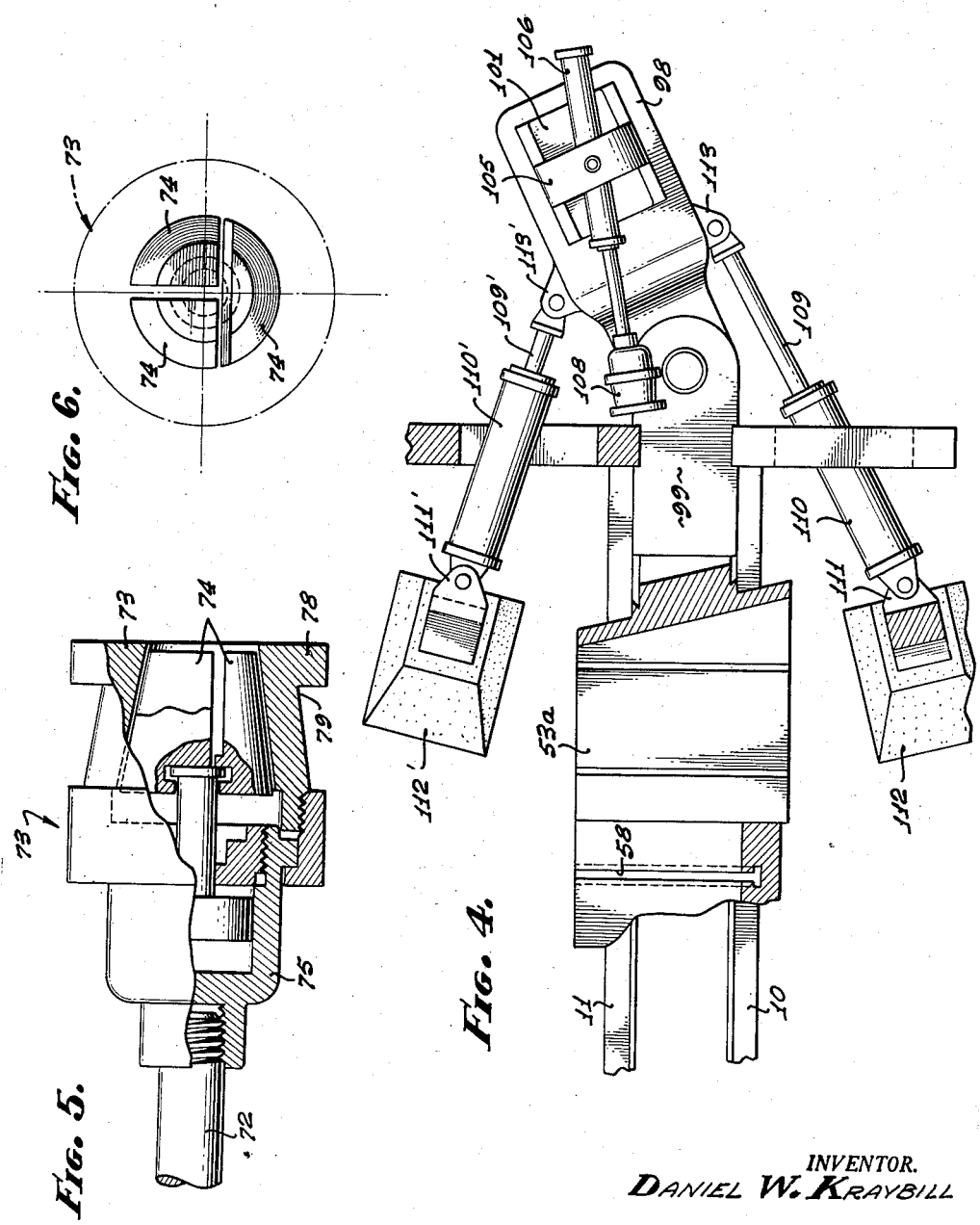

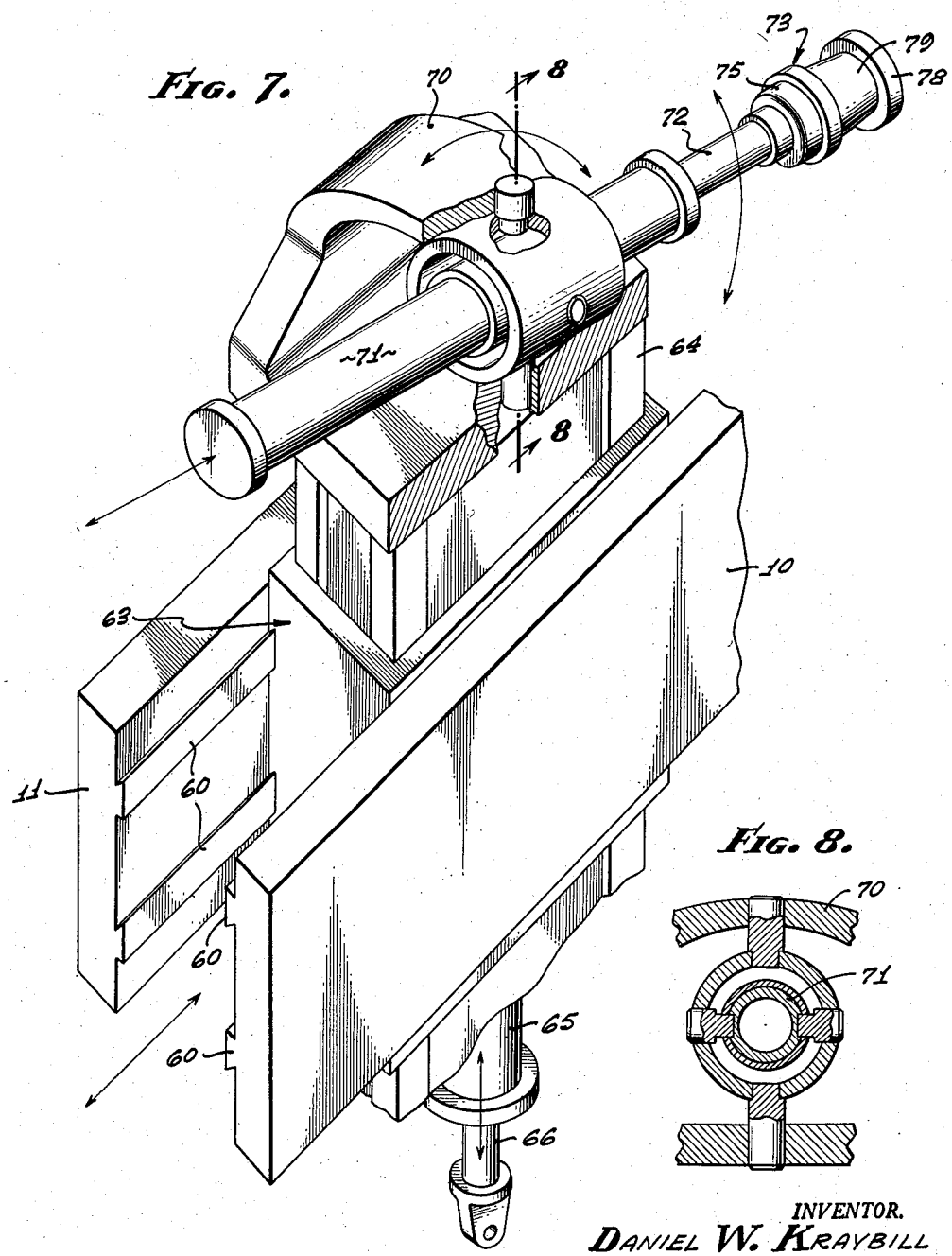

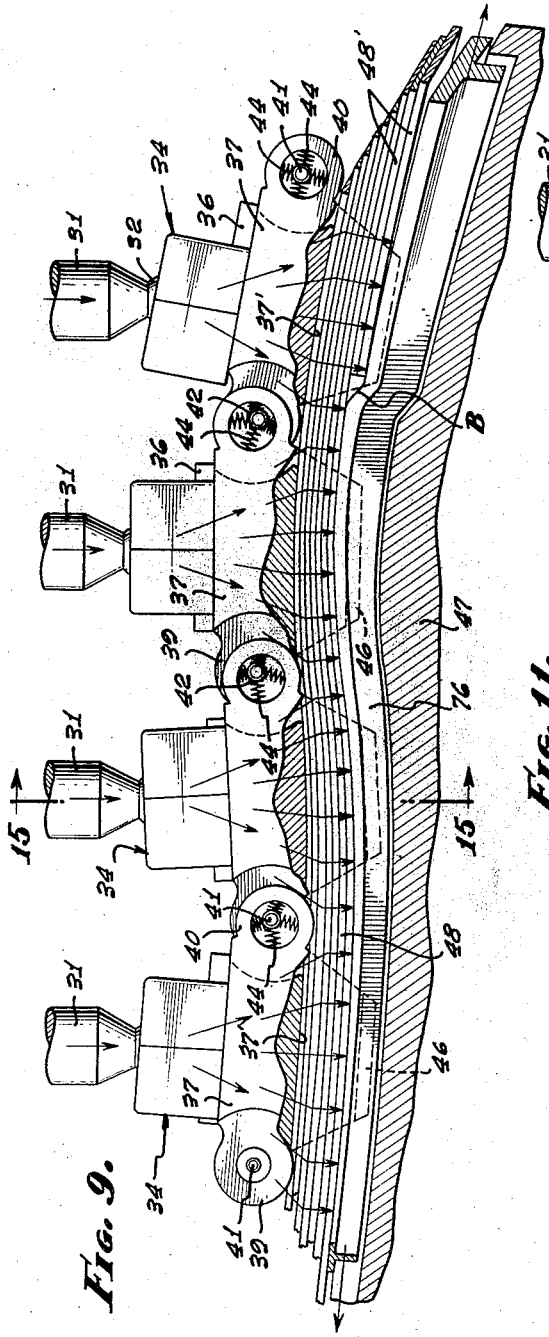
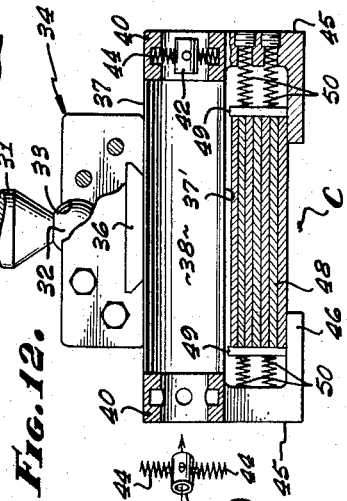
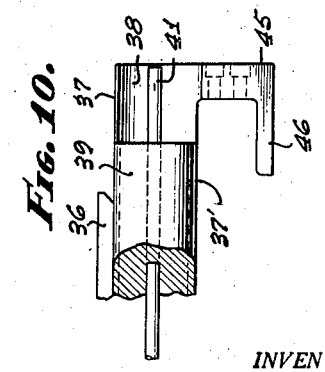
INVENTOR.
DANIEL W. KRAYBILL

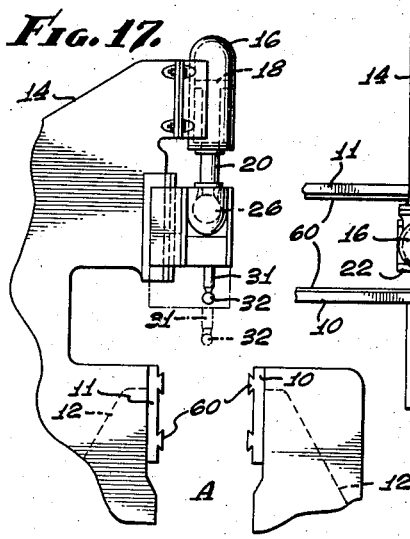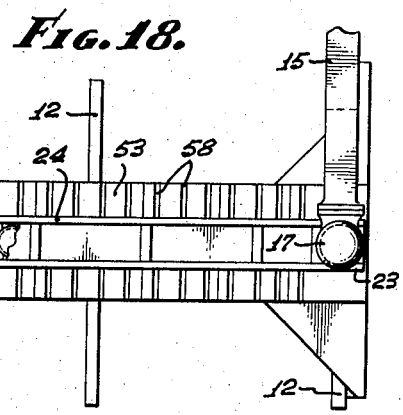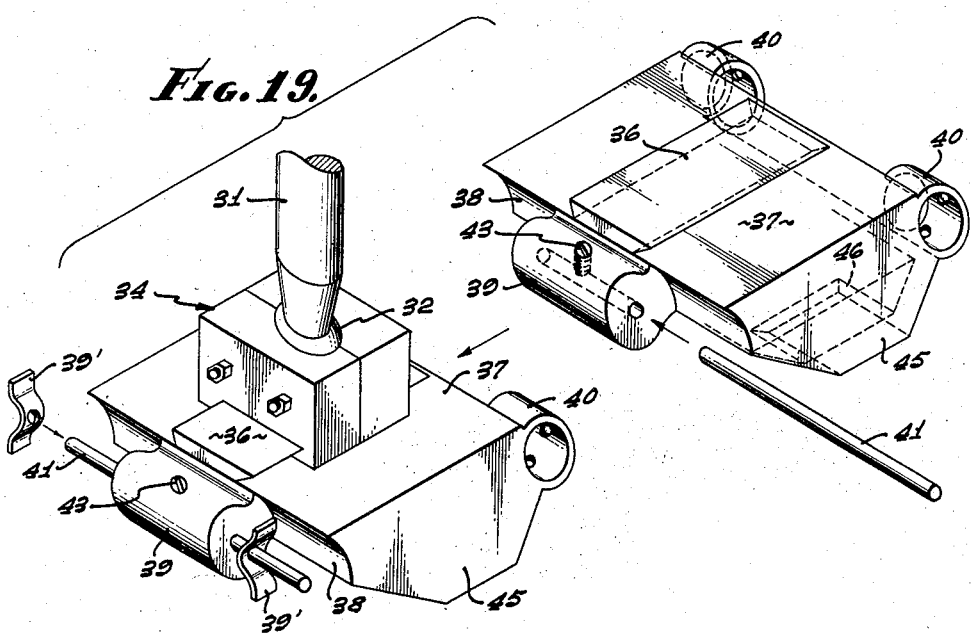

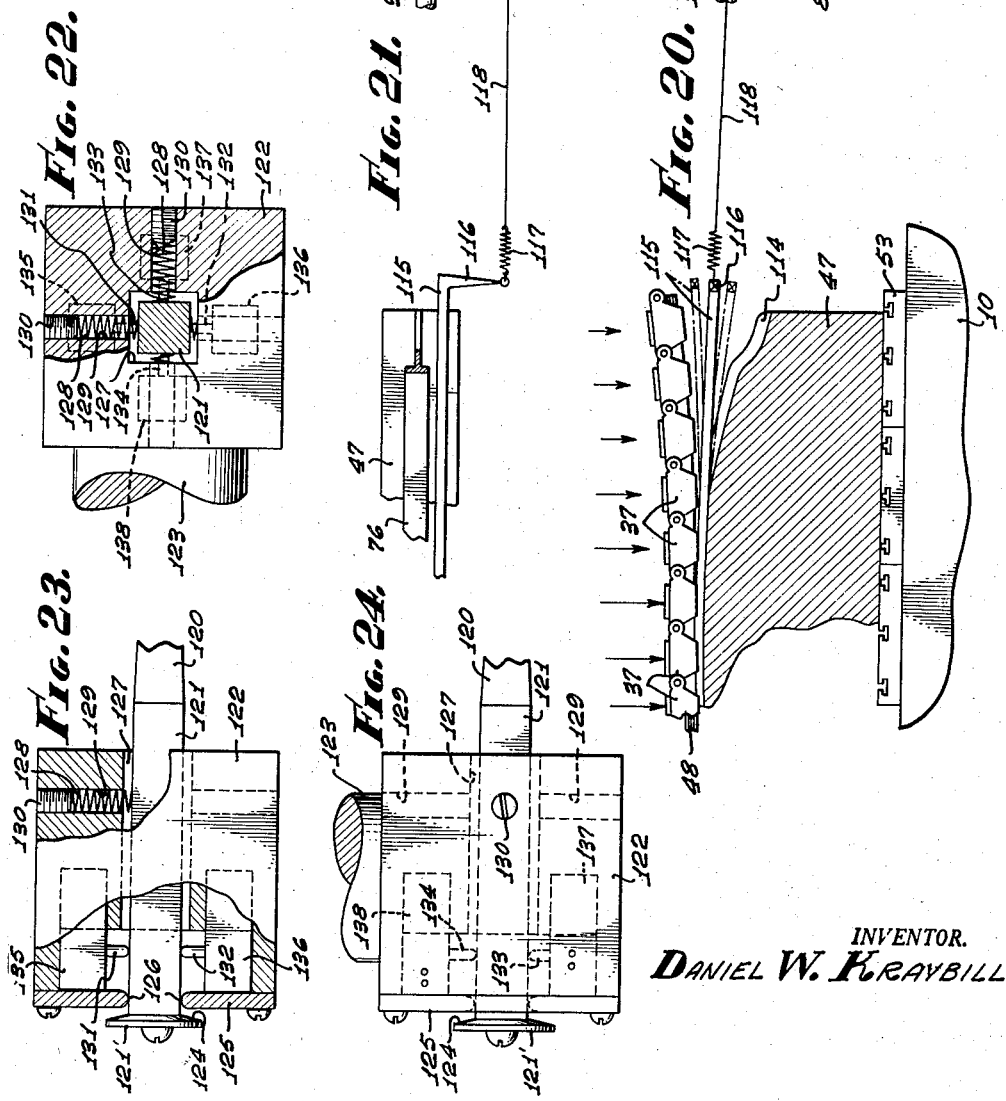

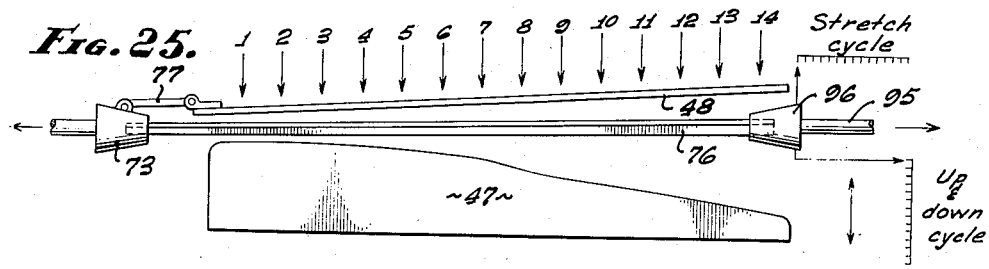
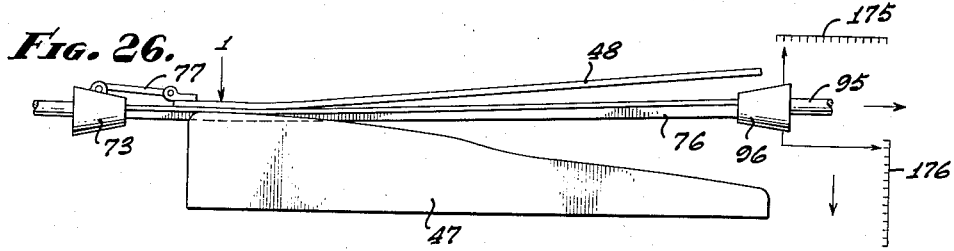
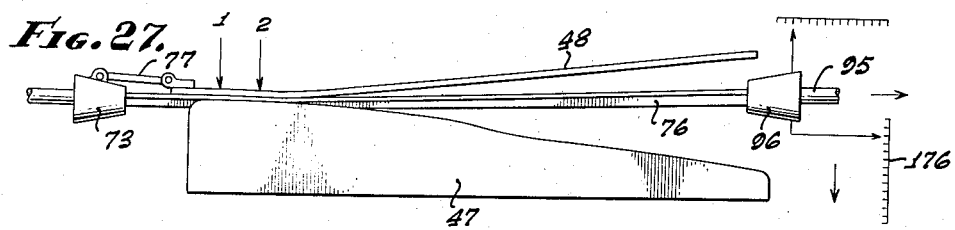
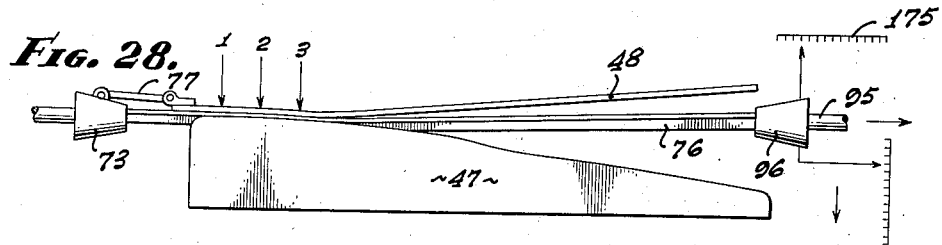
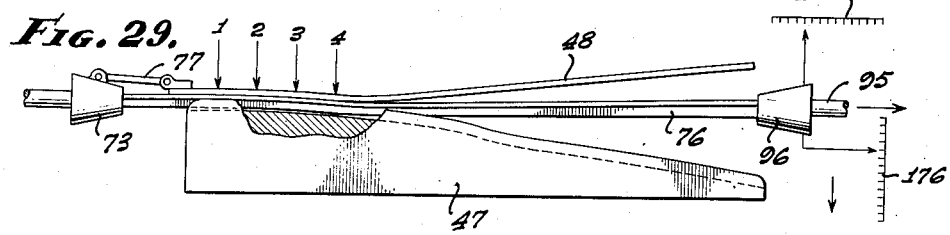

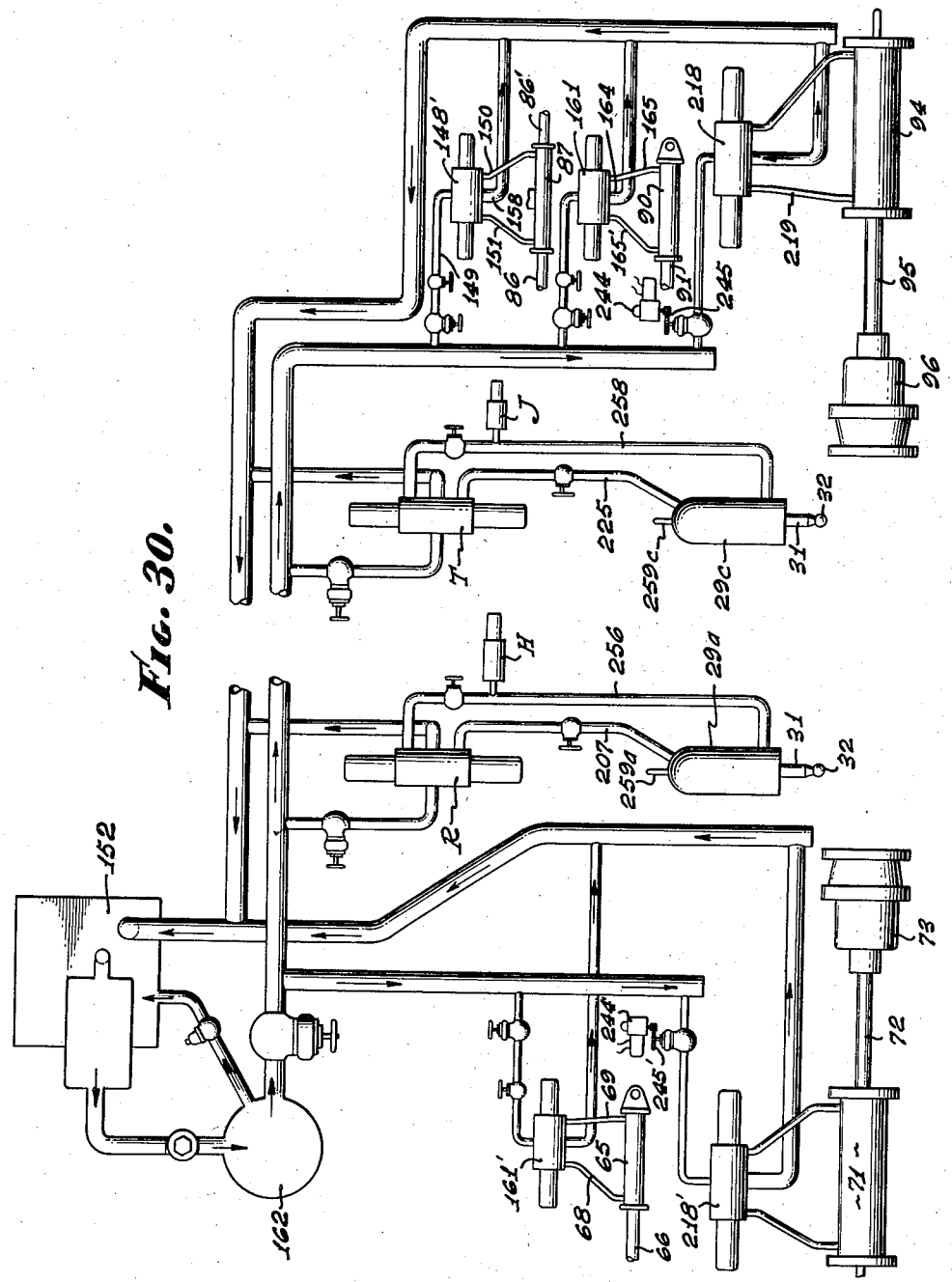

INVENTOR.
DANIEL W. KRAYBILL

United States Patent Office 2,850,071
Patented Sept. 2, 1958

2,850,071

METHOD AND APPARATUS FOR STRETCH-FORMING METAL AND CONTROLLING DIRECTION OF PULL

Daniel W. Kraybill, Downey, Calif.

Application October 18, 1954, Serial No. 462,691

17 Claims. (Cl. 153—48)

This invention relates to the formation of metal by stretch for use particularly in the manufacture of stocks and parts for industrial equipment, such as automobile, refrigeration, railroad cars, structural metal, airplane frames and others, and inasmuch as the invention contemplates the fabrication of accurately formed parts with a more permanent set within the metal, it relates to a new method of treating metal and in general all material capable of being shaped, to produce complete parts for unlimited industrial utilization, with a minimum cross-sectional change.

Heretofore, and with presently available stretch forming apparatus and the method carried out thereby, it has not been possible to form accurate parts with shallow curvatures consistently. It is not only difficult, but in some cases practically impossible to stretch equally, shallow contoured parts and attain a uniform yield point in the material the unit length of the contour.

It is also more difficult to create a fixed change in contour if the contour of the object is very slight, and this is because of excessive material and die drag which makes it difficult if not impossible to use available mechanisms to obtain a sufficient yield point in all the cross-sectional areas that will result in a sufficiently and accurately drawn part, or in a part having permanent elongation, that will consequently remain in permanent contour.

Furthermore it is impossible, with presently available methods, to stretch a reverse curve or to stretch a tapered part, and there are many sheet metal and extrusion parts that cannot be satisfactorily formed with presently designed stretch-forming equipment without considerable hand-forming operations after the stretching operation.

The prime objects of the invention are to provide a means that will simplify involved forming procedures for metal parts now being fabricated; to provide an apparatus that will evenly distribute the stretch forces and insure the possibility of effecting one hundred percentum of the cross-sectional area of the metal to the point of yield; to provide a forming machine for metal that will utilize more efficiently the forming potential of basic stretch forming methods and thereby be capable of stretch forming innumerable parts that at present are being machine tapered, contoured and shaped after forming; to provide a method and apparatus that will make it possible to use tapered stock direct from the mill and that will eliminate the extensive hand-forming and straightening operations now required when using present methods.

Another object of the invention is to provide a means for stretch-forming parts with definite permanent elongation and with no appreciable spring-back, thus making possible the manufacturing of forming tools to net contour and greatly reducing the labor involved in the development of tooling in addition to economizing the cost of trial runs to prove the contour of the tools and eliminating the waste of critical raw material used in trial runs.

Another object of the invention is to provide an apparatus for stretch-forming metal objects and parts difficult or impossible to finish, except by special fabrication methods, and to eliminate the necessity of performing various heat-treating cycles, machining and other costly and time-consuming operations.

It is a well known fact that the more shallow the contour is of a part or object, whether compound or not, and the more straight-lined it is, the more difficult the forming operation becomes, and hence, it is a further object of the invention to provide a method of an apparatus for giving to a part or object a permanent and accurate shape regardless of the shallowness of the contour desired.

A still further object of the invention is to provide a means for forming numerous sheet metal and shaped extrusion parts, that cannot be formed satisfactorily with present equipment without considerable hand-forming operations, after the stretch-forming operation.

A further object of the invention is to provide a method and apparatus by which a more permanent set within the material of the formed part, and hence the fabrication of more accurate parts may be achieved; by which a more completely formed part may be fabricated and hence the production of a greater number of parts in a shorter period of time may be obtained; in which identically shaped parts, or parts that retain the original contour that was given them by the die, may be manufactured and be truly interchangeable, and to provide means for consistently producing accurately contoured parts.

A further object of the invention is to provide a method and machine by which tapered sheet metal and extrusion with varying cross-sectional areas may be formed.

It is a further and important object of the invention to provide a means for performing stretching operations on a wide variety of parts that are required and adaptable to both the aircraft and commercial fields and to produce such parts with greater and closer tolerances, better uniformity and far more economically than heretofore.

These and other objects are attained by the form of apparatus shown in preferred design and structure in the accompanying drawings, in which like numerals designate like parts, and in which:

Fig. 1 is a side elevational view showing a machine embodying our invention.

Fig. 2 is a horizontal sectional view, on line 2—2 of Fig. 1 with the bolster removed for clarity of disclosure.

Fig. 3 is an enlarged side elevation of a modified form of means for supporting the stretch facility and moving the same and its associated complements in an arcuate path; the base or foundation being shown in fragmentary section.

Fig. 4 is an enlarged plan view of Fig. 3, with track and die support shown in fragmentary section.

Fig. 5 is a side view, mainly in section, of a form of chuck used in this invention.

Fig. 6 is an end elevation of the chuck, looking from the right of Fig. 5 and showing only the clamping jaws.

Fig. 7 is an enlarged perspective view of the carriage shown at the left of Fig. 1, with the carriage mounted for horizontal travel on its track, the elevator in the carriage movable vertically and the cylinder, with its piston rod and chuck surmounting the elevator and swiveled thereon for universal movement.

Fig. 8 is a sectional illustration on line 8—8 of Fig. 7.

Fig. 9 is a side elevation, partly in section of a series of shoes, showing the floating pivot means for interlocking them, the plates carried thereby and the part to be formed against the die.

Fig. 10 is a fragmentary end view of one of the shoes.

Fig. 11 is a side elevation, partly in section, of one of the shoes.

Fig. 12 is a section on line 12—12, Fig. 11, looking in the direction of the arrow.

Fig. 13 is a fragmentary side elevation of a pair of shoes showing the forming and jogging plates, as applied to a part to be formed.

Fig. 14 is a perspective view of typical parts, such as longerons formed for use in airplane frames.

Fig. 15 is a section on line 15—15 of Fig. 9, showing the angulation of one of the shoes in a horizontal plane.

Fig. 16 is a section on line 16—16 of Fig. 1, looking in the direction of the arrow.

Fig. 17 is an end elevation looking from the left to Fig. 1 with the carriage removed.

Fig. 18 is a partial top plan view, showing the crosshead and the pressure cylinders carried thereby.

Fig. 19 is a perspective view of a pair of shoes disjoined and showing assembly mechanism.

Fig. 20 is a fragmentary side elevation, showing the stretch facility, shoes and die, and means to control the stretch facility to govern the alinement of the part to be stretched with the die.

Fig. 21 is a fragmentary plan view of Fig. 20, with the shoes removed.

Fig. 22 is an enlarged sectional view taken on line 22—22 of Fig. 20, showing micro-switch control mechanism for the guide control member.

Fig. 23 is a side elevation partly in section of Fig. 22, showing up and down switch control for the stretch facility.

Fig. 24 is a plan view of Fig. 23.

Figs. 25 through 29 illustrate the initial and progressive steps for accomplishing the retention and stretch (the transverse movement not being shown).

Fig. 30 is a diagrammatic view of the fluid pressure system involved in this disclosure.

The base and cross-head

Figure 31:
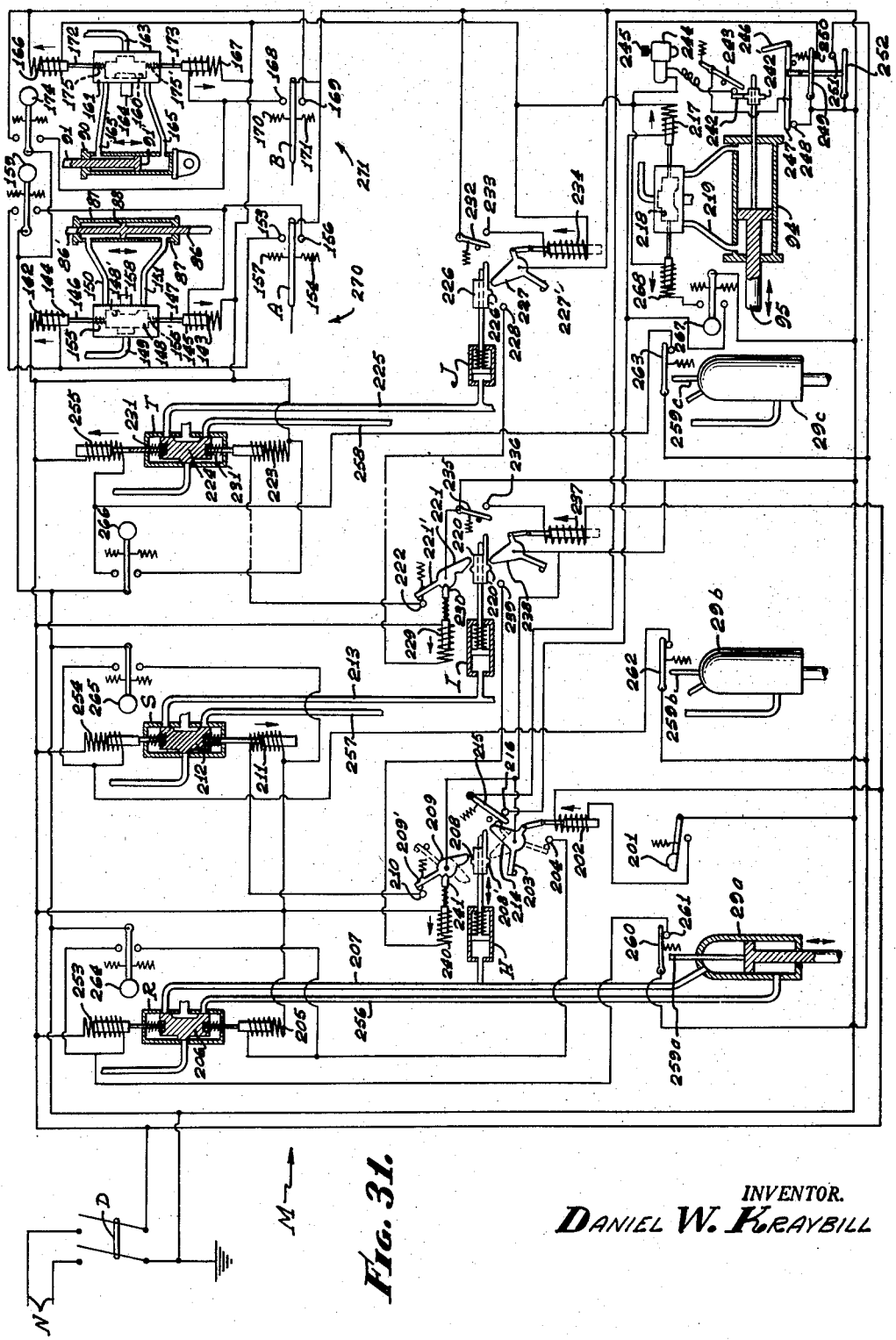
Fig. 31 is a wiring diagram for the electrical circuit.

A pair of spaced, longitudinal plates 10 and 11, are supported by a series of stanchions or upstanding columns 12, that rise from a suitable foundation, 13, and these plates constitute the main support for the elements and parts presently referred to. A part of the main support includes two frame members 14 and 15, which are spaced apart, Figs. 1 and 2, and rise above the surface of the longitudinal plates 10 and 11. Substantially they define a C-form above the plates and provide, with the plates 10 and 11, a rigid frame, seen more clearly in Fig. 16, which is fixedly secured to, or anchored in the foundation 13.

To the upper part of each of said frame members 14 and 15, is bolted or otherwise secured a cylinder 16—17, housing the usual pistons 18—19, to which are connected piston rods 20 and 21. These piston rods 20 and 21 are respectively connected to opposite ends 22—23 of a crosshead 24, by ball joints 25—26 and the cylinders 16 and 17 are arranged to be supplied with pressure fluid, as oil or air, through pipes 27—28, for moving the piston rods and hence, the cross-head in an up and down direction. The cylinders 16—17, it will be noted in Figs. 16 and 17, are disposed in line with but above space A between the plates 10 and 11, as will appear later. The cross-head 24, carries or is provided with a battery of cylinders 29, in number regulated by the extent of the part to be formed. Referring to Fig. 16, each cylinder 29 contains a piston 30 and piston rod 31, projecting beyond the cylinders 30. The piston rods 31 are formed or provided with globular ends 32, that are adapted to be contained and retained in hollow seats 33, Figs. 9, 11, 12, 15, 16 and 17.

The pressure shoes

The seats 33, are formed in blocks 34, each of which is composed of sections, Figs. 9 and 11, that are bolted together. Each block 34, is provided in the bottom thereof with a mortise or groove 35, Fig. 15, having beveled walls; and disposed for longitudinal sliding movement in said groove is the beveled tongue 36, of a pressure shoe, shown at 37, Fig. 15. Each shoe comprises a substantially rectangular body, Fig. 19, provided at one end with an arcuate surface 38, and a boss 39 projecting therefrom and of narrower extent than the body. At the other end, said body is provided with relatively narrow cylindrical extensions 40, projecting longitudinally from the sides of said body. These extensions are spaced apart a distance greater than the extent of the boss 39 of a companion shoe body, as seen in Fig. 19 to which it is adapted to be joined by a pin 41, that passes centrally transversely through the boss 39. The pin 41 extends beyond the sides of the boss and journals at its respective ends in short tubular bearings 42, Figs. 11 and 12, disposed normally concentrically within said cylindrical extensions 40 of companion shoes and pivotally connects said shoes to form an integrated chain of shoes. A set screw 43, penetrating the boss, holds the pin 41 against displacement.

These bearings 42 are floating and normally concentric with the cylindrical extensions 40, and for this purpose are supported in the extensions by radial springs 44, which maintain the bearings 42 and pin 41, normally centered, but permit them to assume relative eccentric positions. Between the respective outer ends or sides of the boss 39, and the inner sides of the tubular extensions 40, are interposed equalizer springs 39' which are perforated for passage therethrough of the pin 41. Because of the radial coil springs 44 and the flat springs 39' each pressure shoe in a pivotally interlocked series, as shown in Fig. 9, automatically adapts itself, in unison with or wholly independently of any other shoe or shoes to irregular surfaces or to surfaces at an angle to the horizontal either lateral, longitudinally or vertically, in accordance with the contour of the die. Each body has depending side walls 45, that terminate at the bottom in oppositely disposed and inwardly directed shelves 46, for receiving and supporting a plurality of superposed elongated metal plates 48, of a length required substantially by the die 47 used in shaping the stretched object and totaling at least the extent of the combined pivoting shoes. The shelves 46, of each body are, as seen, projected inwardly in spaced relation to each other, Fig. 12, the area of the space C between the inner edges of the shelves exposing the lower-most of the superposed plates 48, the width definition of which is greater than that of the object to be shaped and stretched. These plates 48 transmit the pressure exerted on the presser shoes 37 to the object that lies in contact with the die 47. They are held in centered position on the shelves 46 of the shoes by flat members 49, that are maintained in contact with the respective edges of the plates 48 by yielding or flexible means, as springs 50. These springs 50 function to maintain the plates 48 in their normal superposed position with their edges vertically alined and to return them to that position when the pressure on the shoes is relieved and the shoes and the plates carried thereby are lifted from engagement with the formed object.

Referring to Fig. 15, it will be seen that where the plates 48 are pressed against an object for giving to it a shape or form at an angle to the horizontal, they, the plates 48, will move relatively to each other and automatically assume the required angularity in conformity with the die 47, and in response to the angular adaptation of the pressure shoes 37, which in accordance with the prescription above alluded to, are universally movable by reason of the ball joint connection with the piston rod and also by the slidable association of the hollow seats 33, with the shoes. When the pressure of the pressure shoes 37 is relieved and removed from a formed and stretched object the shoes and the plates 48 carried thereby automatically return to normal position under the influence of the springs 44, and 39'. It will be clear that within certain limits, a shoe assembly may be employed for forming and retaining objects and parts that are less in longitudinal extent than the assembly. In such an event, only a part or a required number of the aggregate pressure cylinders may be called into use to exert pressure on but a selected group of pressure shoes 37 in conformity with the die 47, that is configured for a smaller object or part or one that is less in extent than the die. The formation of such a part may be effected with equal facility without disorganizing the assembly of pressure shoes. Only the required number of compression cylinders need be employed and their number may be regulated according to the extent of the object to be operated on.

Inasmuch as it might be impracticable and costly to give to the bottom 37' of each shoe 37 a contour that would meet many variations in a die surface, I have found that by making such bottom slightly convex, the pressure exerted by shoes so formed will be readily and effectively distributed to the part or object through the plates 48.

It is not necessarily an essential that the shoes be joined in the manner related or any other, since the method of progressively applying pressure and stretch-forces to accomplish the formation of a part with no appreciable spring-back and in the manner herein set forth, may be carried out by a variety of means.

Referring to Fig. 9, it will be noted that the part to be stretch-formed is tapering and hence of varying cross-section, and this requires not only that the application of pressure be progressive but that the pressure and tension be progressively increased as the greater cross-sectional part is acted on. The control of this pressure and tension for this purpose will appear later in this description. It will also be seen from Fig. 9, that a joggle B may be formed in the part shown, or any part by the simple manner of supplementing the longitudinal plates 48 with the shorter plates 48'.

The cross-head 24, with the cylinders and shoes connected to the piston rods thereof is lowered into operative relation to the part or object that is to be formed to the contour of the die 47, by fluid pressure which also effects the elevation of the cross-head 24 and its parts.

The pistons 30, in the respective cylinders 29, are hydraulically or pneumatically operated in up and down direction by the fluid pressure derived from a suitable source, Fig. 30, and admitted to the first cylinder of the battery through pipes 207 and 256, and thereafter governed by automatic devices or valves, whereby when a certain pressure is reached in such first cylinder, the pressure fluid passes over to the adjacent cylinders in cyclic progression and successively implement the pistons 30 and shoes 37 to exert pressure upon a part or object that is to be given the shape or contour of the die 47.

The control of the passage of fluid under pressure from one cylinder to another to obtain a uniform pressure from each cylinder of a battery or to obtain a variation of such pressure, where required, for instance, in operating upon parts with a tapering or varying cross-section, will appear later.

The die

The die 47, which is adapted to be disposed immediately below the laminations or plates 48, of the shoes 37, is secured to a series of bolsters 53, by bolts 54, or in any other convenient manner, and for this purpose, the die 47 is provided at opposite sides with longitudinal flanges 55, that are adapted to be engaged by nuts 56, on the bolts 54. The heads 57 of the bolts 54 are adapted to be inserted in T-slots 58 transversely provided in the bolsters 53, which are slidable on the ways 60 and are removable therefrom. They constitute an integral and stressed part of the track assembly and they supply the conventional supporting means for the stretch carriages hereinafter described. The bolsters 53 are laterally grooved below the planar surface thereof, as seen at 59, Fig. 16, for fitting over and sliding on dovetail ways 60 that are provided on and project beyond the faces of spaced members 10 and 11, secured to the supports 12, 14 and 15. These bolsters are mounted for sliding movement on the ways 60 and, as stated, are removable entirely or only partly, as required by the extent of the die 47. To facilitate the removal of the bolsters 53, each is provided on the bottom with a plate 62, that is secured thereto in any convenient manner for ready removal and laterally extends below the oppositely disposed dovetail ways 60 of the supports.

The carriages and part-holding and stretch mechanism

Mounted on the spaced supporting members 10 and 11 at one end thereof and slidable horizontally on the ways 60 thereof, is a carriage 63, Figs. 1, 2, and 7 for carrier 64 that is vertically movable relative to said carriage. Said carrier 64 contains a cylinder 65, and a piston rod 66, with the usual piston, not shown. The piston rod 66 is connected to and carried by a stirrup 67, that forms a part of the carriage 63, at the underside. Pressure fluid is admitted to the cylinder 65 in said body 64 through pipes 68 and 69 from a suitable source and controlled by means presently described. The carrier 64 is provided at the top with a yoke 70 which mounts a cylinder 71 for pivotal movement and the piston rod 72 of which is provided with a chuck 73, having the usual jaws 74, Fig. 5, which are operable by cylinder members 75 to grasp and hold an article 76. Since the chuck 73 functions to grasp and hold one end of the object or part during stretch, tension applied to the other end of the part, and operates in conjunction with the shoes 37, afore described, means in the form of a jointed hook 77 are provided for holding the interlocked shoes in place during such stretching operation. This hook means, as seen in Fig. 1, that is pivoted to the first shoe 37 of an interlocked series, as seen in Fig. 1, engages the flange 78 of an annular groove 79 that is provided with pressure from cylinder 75 and holds the assembly of interlocked shoes in place during the stretching operation.

The carriage 63 is horizontally movable on the ways 60, as afore stated and the travel of the carriage horizontally is motivated by any suitable mechanism, such for instance as shown in Figs. 1 and 2, and comprising a compound worm mechanism 80, rotated by power means 81, through a train of gears 82, in well known manner. The worm 80 is connected by swivel means 83 to the carriage 63 and the rotation of the worm moves the carriage in either forward or backward direction or holds it immovable in any position of its adjustment and during a stretching performance.

As stated, the carriage 63 and the chuck 73, on the body 64 thereof, either holds an end of the part 76 to be stretched and formed or is operated to stretch the part. The carrier 64 of the carriage 63 is vertically movable relatively to the carriage 63 by the means referred to continuously progressively in accordance with the inclination or declination of the die surface of 47 and in substantial synchronism with the progressive pressure of the shoes 37, that is to say, the pull exerted on the part is always substantially tangent to the die in the area immediately adjacent to the stretched portion, and is so maintained throughout the stretch operation by the vertical movement of the chuck-carrier which moves the part in synchronism with the form imparted to the part or object by the die, and by stretch and pressure, where the chuck 73 is employed both for holding and stretching. In this wise the body 64 of the carriage moves the part or object progressively in synchronism with the successive changes in the contour of the die. Such a stretching operation may be exerted either at one end or the other end of the part of object 76 or simultaneously at both ends and this will appear more fully in the description following of the companion stretch-facility.

To the other end of the supporting members 10 and 11, is attached a carriage 84 that is provided with tracks for engaging the ways 85 on which the carriage is slidable transversely. The transverse movement of the carriage 84 is effected by a piston rod, 86 and 86', Fig. 2, that extends through a horizontally disposed cylinder 87, secured substantially centrally of the ways 85, and projects beyond the respective ends of the cylinder 87, the other ends of the piston rod being suitably connected to the carriage 84. The piston rod 86 and 86' is provided with the usual piston 88, by which the piston rod is actuated in the cylinder in one or the other direction by fluid pressure of desirable selection and derived from a main source. The control of the transverse movement of the carriage 84 will appear in connection with the description of the control for operation of the carriage 63 and its elevatable body 64.

The carriage 84, houses a substantially rectangular body carrier or elevator 89, that is mounted to slide therein vertically. The operation of this body 89 in either up or down direction is adapted to be brought about by a cylinder 90, Figs 1 and 2, that is pivotally connected to the body at the top and contains a piston 91' (Fig. 31) to which is secured a piston rod 91, that at its end is pivotally connected to a stirrup 92, at the underside of the carriage 84. The movement of the cylinder 90 is adapted to be effected by fluid presure, controlled as hereinafter specified. A cap or bonnet 93 surmounts said body 89 and journals a cylinder 94, the piston rod 95, of which carries a chuck 96, identical in structure to the chuck 73 heretofore described, and shown in Figs. 4 and 5. This chuck 96 is adapted to grasp and hold the other end of the part 76, that is to be stretched and formed to the pattern of the die 47, and is rotational with the cap or bonnet 93 in a horizontal plane to respond to variations in such plane in the part or object during the formation thereof. The piston rod 95 is movable in the cylinder 94 by fluid under pressure, as related later herein.

It will be observed that in the method disclosed, the pressure of the part against the die is in no wise responsible for any stretch in the part and this essential differs from press-forming an object to the pattern of a die, in which, while a certain amount or degree of stretch may be involved, the stretch is unevenly distributed and non-uniform. In a product thus obtained, many counter stresses are developed that make impossible a permanent set within the material. Accurate parts, permanently true to the configuration of the die are therefore not obtainable, nor are the tendencies of spring-back offset or so minimized that they are negligible.

In manufacturing with present apparatus, articles or parts having a multiplicity of divergencies from a straight line, internal stresses and counter forces are set up in innumerable areas that make it necessary to fashion them for ultimate and successful use by subsequent machining and/or hand-work.

In the present method, the formation of parts is in a wide sense substantially the result of a flow into the shape or contour of the die, and this flow, unlike the behavior of a protean mass, which acquires the outline and form of the mold, is the effect of continuously pressing the stretched area only of a part to the form of the die, and maintaining them pressed regardless of its configuration. In such a progressive exertion of form-pressing a stretched area, the set in the material remaining constant, the final form of the part or article will remain constant or accurate with the pattern of the die with practically no spring-back and with no distortion, wrinkle, or uneveness.

There is no further stretch produced in the limited stretched area that is held retained in contact with the die when the unstretched area of the part is subjected to a stretching tension, nor is the stretch of the material limited to any specific area, but is exercised on the entire area not under pressure. Thus the pressure is exerted only on limited stretched areas to press them progressively to the form and contour of the die, and the stretch is effected on unlimited areas in progression following the imposition of pressure on limited areas.

Figs. 25 to 29 show the progression of the application of the forming and holding pressure to a metal part and the progressive stretching operation of such part, the operation of stretching, as explained, occurring sequentially to the application of the forming and retaining pressure.

Referring to Fig. 25, the pressure applying cylinders and piston rods comprise, for purposes of illustration, 14 juxta-posed units in normal position above the part 76 to be formed and pressed against the die. In this view, all the cylinders and piston rods are in inoperative position.

Fig. 26 shows the operation of the first of the 14 pressure applying means, signifying the beginning of the operation. The one end of the article, part or object is subjected to initial pressure, which presses and holds such end against the die. Practically simultaneously with the application of the retention pressure, controlled stretching forces are applied to chuck 96, thus causing the article, part, or object to yield or elongate and take permanent set to the configuration of the die. A part or object held at one end by the chuck 96 and subjected to angulation in a horizontal or vertical plane by the carriage mentioned will exhibit areas of undue stress, which, in a completed part, results in distortion and hence produces malformation in the stretched part. While, with the arrangement disclosed and described in connection with Fig. 1, the stretch of the metal is exerted in practically all directions, inasmuch as the stretch facility is controlled to follow the vertical and horizontal angulations of the part under treatment to be formed in conformity with the die, the rectilinear travel of the facility is apt to create undue stresses that will be reflected in many ways in the finished product, but mainly in the degree of spring-back, permanent elongation, and preservation of the structure of the material.

I have found that these stresses in a part to be formed, may be reduced to a minimum if not entirely eliminated by providing a means by which the stretch force is exerted evenly in all directions and will affect one hundred percentum of the cross-sectional area of the metal. Such a means is shown in the modified embodiment of Figs. 3 and 4, and includes a carriage 98, similar to the one shown at 84, Fig. 2, that is pivoted to upper and lower plate extensions 99—100, of which 99 is secured between the supporting rails 10 and 11 at the end thereof. Fig. 4, which is a plan view of the modification of Fig. 3 illustrates the modified bolster 53a as being wider than bolster 53 of Figs. 1, 2, and 16, and as overriding tracks 10 and 11. The carriage 98 houses an elevator 101 that is arranged to be operated vertically by a cylinder 102, having a piston, not shown, and a piston rod 103, the end of which is pivotally connected to a cross member 104. Operation of the cylinder 102 to raise or lower the elevator 101 is preferably by fluid pressure, later described in connection with the operation of the chuck 96, Fig. 1, comprising one of the stretching facilities.

A hood 105 surmounts the elevator 101 and pivots thereunder, a cylinder 106, piston rod 107 and chuck 108 for gripping an end of the part to be stretched. The hood 105 may be swiveled to the top of the elevator 101. The carriage is swingable in an arcuate path about the pivoting connection with the plate extensions 99—100, and such swinging traverse is effected in both directions by piston rods 109—109', housed in usual manner in cylinders 110—110' that are pivotally connected with anchors 111—111' upstanding from piers 112—112'. The outer ends of the piston rods, 109—109' are pivotally attached to areas 113—113' on opposite sides of the carriage 98. The arcuate travel of the carriage is controlled by the movement of either of the piston rods 109—109', that are moved by fluid pressure derived from a suitable source. The arcuate movement of the carriage 98, carrying with it the stretch facility, accurately controls the alinement of such facility or chuck with the die without creating undue stresses in the part to be formed and stretched, and such alinement is nicely, accurately and precisely governed by means which implements the movements of the carriage 98, its elevator 101 and its stretching chuck in true accordance with the contour of the die, and regardless of its angulations.

Referring to Fig. 1, and especially to the carriage 84, that, as explained, is designed to travel transversely thereby to carry with it the carrier 89, for elevating or lowering the chuck cylinder 94, and its associated parts, it will be noted that the movement of said carriage 84 is in a rectilinear direction or substantially at right angles to the longitudinal axis of the die. A part or object held at one end by the chuck 96 and subjected to angulation in a horizontal or vertical plane by the carriage 84 mentioned, will exhibit the required controlled stresses, which, in a completed part, results in a permanent set and hence produces the desired configuration in the stretched part. While, with the arrangement disclosed and described in connection with Fig. 1, the stretch of the metal is exerted in all directions, inasmuch as the stretch facility is controlled to follow the vertical and horizontal angulations of the part under treatment to be formed in conformity with the die, the rectilinear travel of the facility will create the required stresses that will be reflected in the finished product by conformity to the die with no springback, with permanent elongation and preservation of the structure of the product material.

I have found that these stresses in a part to be formed may be reduced to a minimum, if not entirely eliminated by providing a means by which the stretch force is exerted evenly in all directions and will affect one hundred per centum of the cross-sectional area of the metal.

Means for controlling the fluid pressure means are provided by elements preferably electrically actuated and such means in combination with the fluid pressure control means will now be described, reference being had especially to Figs. 20 to 24 and 30 and 31.

Aligning means for the stretch facility

As has been previously related herein, reference now being had to Figs. 1, 2, 20 to 24 and 30 and 31, the carriage 84 is shiftable transversely and the elevator or carrier 89 housed in said carriage 84, is movable vertically as is the chuck 96 that is arranged to grip the one end of the part and to stretch the same. Under ordinary circumstances where the die used to form stretch smooth and planar parts, its surface is even and smooth and the control of the stretch facile and satisfactory; but where a part is characterized by rolling surfaces and angulations, in either a vertical or horizontal plane, or both, it is highly important, if undue stresses, malformations and defects are to be avoided, to maintain the stretch-pull always in a direct line with the part. To accomplish this maintenance automatically, the carriage 84 and its elevator are independently relatively movable, the carriage 84 by the piston rod 86 and its cylinder 87, and the elevator 89 by the piston rod 91 and its cylinder 90, in conformance with and controlled by the die 47 which for this purpose is provided with a groove or other formation or device 114, which in every respect is a replica of the contour of the die. In this groove or recess 114 is disposed a spring bar 115 of metal, plastic or any other suitable material, and of a depth equal to the depth of the groove, the upper surface thereof lying flush with the die surface, as seen in Fig. 20.

Part 76 shown in Fig. 1, but not in Fig. 20, is placed between the laminates 48 of the shoes 37 and the die 47, and during the progressive application of pressure to said laminates, said part is forced against the die 47 and the spring bar 115 is simultaneously and progressively pressed into the groove 114 and there held during the forming and stretching operation.

The spring bar 115 is provided at the end thereof which projects beyond the die 47, with a finger 116, extending outwardly at right angles thereto in a horizontal plane, Fig. 21. To the end of the finger 116 is connected or attached a coil spring 117 to which is secured one end of a cable 118, while the other end is looped or caught in a ring 119 associated with the end of an arm 120. This arm is preferably integral with a bar 121, that for the major part of its length is housed in a case 122 integrally connected with the arbor 123 which pivotally mounts the cylinder 94 in the bonnet or cap 93. As seen, the bar 121 is disposed centrally longitudinally of the housing and extends beyond the front and rear ends thereof, the front end of the bar 121 carrying or terminating in the arm 120. The rear end of said bar 121 passes through a square opening in a cover plate 125 that is screwed to the rear of the housing or case 122 and pivots on the four edges that define the said opening. These edges for this purpose are preferably rounded, as seen at 126, though they may be acuminate. A disk 121' fastened to the rear end of and diametrically greater than the bar 121 assures association thereof with the housing or case 122, and maintains it in position. The bar 121, it will be noted, passes through a square passageway 127, provided centrally of the case 122, and is of less cross-sectional extent than said bore, as seen in Fig. 22. Thus the forward end of the bar and the arm 120 thereof may pivot on the rounded edge 126 of the opening, as and for the purpose presently pointed out. The bar 121 is held resiliently in the case 122 by springs 128 disposed about the bar and bearing against the four faces thereof, the springs being contained in holes 129, penetrating the case 122 near the forward end thereof and at right angles to the longitudinal axis thereof. The holes 129 are closed by screw plugs 130 which thread in the outer ends of the same and which may operate to vary the compressive effort of the springs 128, that maintain the bar 121 centered and sensitive to micrometric movement. The spring 117 provides the pull required to maintain contact with beveled surface 124 of disk 121'.

Within the case 122, near the rear thereof and disposed in contact with the four faces of said bar 121, is a plurality of plungers 131, 132, 133, and 134, each engaging a side of the bar 121 and projecting from suitable receptacles 135, 136, 137 and 138 contained in said housing or case 122. These plungers 131 to 134 constitute the actuating means for "micro-switches" 270 and 271, each having switch levers A and B, respectively, Fig. 31, enclosed in said receptacles. The "micro-switches" in said receptacles are of well-known construction and need no further description other than that they are of the single pole type.

The switches, designated for convenience 270 and 271, are in an electrical circuit, generally indicated at M Fig. 31. This circuit also includes solenoids 142 and 143, to the armatures 144 and 145 of which are respectively connected the stems 146 and 147 connected to opposite ends of a valve 148, and projecting through the valve housing at opposite ends thereof. This valve governs the flow of fluid under pressure admitted to the valve housing through a pipe 149 from a suitable source 162, Fig. 30, to the cylinder 87 heretofore mentioned and shown in Figs. 1 and 2. The fluid under pressure passes through line 150 or 151 thereby to move the piston 88 and its piston rod 86 and 86' within and projecting beyond the cylinder in one or the other direction transversely. Since the carriage 84 carries the stretch facility, that is, the cylinder 94, piston rod and clutch or chuck 96, it will be clear that this transverse travel of the carriage 84, will be in conformity with the contour of the die and hold the part clutched accurately to the delineations of the die, that is to say, the stretch operation will occur always in accurate alinement with the die or the configuration thereof. Such alinement in a horizontal plane and the preservation of it throughout a stretching operation is under the government of one or the other of the plungers 133 or 134. These are arranged, as stated, for operation by the bar 121 that, being connected to the spring bar 115, which in the course of the formation and stretching of the part, is progressively pressed into the groove 114 of the die. Any variation in the die contour, vertically or angularly from a straight line, is therefore reflected through the cable 118 and arm 120 of the bar 121, which yields to the pull or pressure exerted by the bar following the groove in the die and thereby operates either the plunger 133 or 134. When the plunger 133 moves the switch lever A of the "micro-switch" 270 into engagement with the contact 153, included in the electric circuit, a circuit is closed, which energizes the solenoid 142 and thereby moves the valve 148 forward in the valve chamber. Pressure fluid through the line 149 is thereby directed to flow through line 151 into the cylinder 87, whereby the piston 88, its rod 86 and the carriage associated with them, are moved backwards.

When the alinement of the chuck 96 with the part or object is obtained in this manner, the bar 121 returns to normal position in the case 122 and equidistant from the walls of the passageway 128. The restoration of the plunger 133 to normal removes it from engagement with the lever A of the "micro-switch" 270 and a spring 154 breaks the engagement of said lever A with the contact 153 in the electrical circuit M, thereby de-energizing the solenoid 142. The valve 148 thereupon, under the influence of a compression spring 155, is moved to a neutral position in the chamber 148' and the spent pressure fluid is returned to the sump 152, Fig. 30.

Similarly the movement of the spring bar 121 presses the plunger 134 against the lever A to effect engagement thereof with the contact 156, which being in the electrical circuit M energizes the solenoid 143, thereby producing a forward movement of the valve 148 in the chamber 148'. So doing, the fluid entering through pipe 149, passes about the valve through pipe 150 to the rear end of the cylinder 87, thereby moving the piston 88 and its associated equipment, including the carriage 84 in a forward direction. The removal of the plunger 134 from the switch lever A permits a spring 157 to break engagement of the lever A with the contact 156, thereby interrupting the circuit and de-energizing the solenoid 143. The valve 148, now no longer restrained by the solenoid, returns to neutral position, the spent pressure fluid passing back to the sump 152, through pipe 158.

Included in the electrical circuit M is a manual switch 159, provided to test the operation of the elements described preparatory to initiating the automatic performance hereinabove alluded to.

As stated, the switch 271 is also in the electrical circuit M, Fig. 31. Heretofore we have described the arrangement by which the carriage 84, with its elevator 89 and the surmounting stretch facility 94—96 is moved transversely to and fro in a horizontal plane, in accordance with the definition of the spring bar 115, as hereinbefore detailed.

It is however, necessary and highly important that the stretch facility be maintained in alinement with the part or object at all times during the stretching process also in a vertical plane to respond to variations and angulations in the die in such plane. For this reason, the elevator 89, is mounted in the carriage 84 to travel therewith and substantially vertically relatively thereto the piston rod 91 projecting from the cylinder 90 and having secured thereto a piston 91' being connected to the yoke 92 of the carriage 84, and the cylinder 90 being pivotally connected to the elevator. Thus the cylinder 90 is adapted to move the elevator 89, while the piston rod 91 is stationarily connected to the yoke 92, Fig. 1.

Fluid under pressure is admitted to the cylinder 90 and to one side of the piston 91', through pipe 165, connecting said cylinder 90 with the chamber 161 of a valve 160. Fluid under pressure flows into said valve chamber 161 from the source 162 through pipe 163 and returns to the sump 152 through pipe 164. Fluid under pressure is admitted to the other side of the piston 91' through pipe 165', when the valve 160 is opened. The control of the movement of this valve 160 is through solenoids 166 and 167 in the electrical circuit, which includes the micro-switch lever B that is held normally out of engagement with contacts 168 and 169, by springs 170 and 171. Each switch lever B is, as heretofore explained, provided with actuator plungers 131 and 132, which project from the switch enclosures 135 and are in engagement with opposite sides of the bar 121. The vertical movement of said bar 121, in response to vertical changes in the contour of the die, which produces a pivoting movement of the bar on the rounding edges 126 of the plate 125, moves said switch lever B. By so doing, the lever B, engaging the contact 169 at one time, closes the circuit to the solenoid 166, the armature of which is connected with one end of the valve 160 by a stem 172. The solenoid being thus energized makes an upward stroke and moves the valve 160 in an upward direction, uncovering the fluid supply line 163 and the pipe 165 leading to one end of the cylinder 90. The cylinder 90 being movable with the elevator 89 and the piston 91' and piston rod 91 being stationary, the fluid pressure from the line 165 will move the cylinder 90 and hence the elevator upwardly with respect to the carriage 84. When, however, the bar 121 moves the plunger 132 to produce an engagement of the switch lever B with the contact 168, the solenoid 167 is energized, while the solenoid 166 is de-energized. Thereby the direction of the stroke of the armature of said solenoid 167 is opposite to that of the solenoid 166 and said armature being connected to the valve 160 by a stem 173, the valve 160 closes the line 165 and opens the lines 163 and 165'. The cylinder 90 thereby is moved vertically downward and there held by the fluid pressure until the bar 121 is returned to normal position in the case 122 by the equalizing springs 130. When this occurs, the valve 160, under the influence of springs 175 returns to a neutral position in the chamber 161, thereby closing the fluid pressure inlet pipe 163 and the outlet pipes 165 and 165', while uncovering the outlet for the spent fluid which returns through pipe 164 to the sump 152.

Also included in the electrical circuit is a manual switch 174, serving the same purpose as the switch 159.

Thus the movement of the carriage 84 and the elevator 89 is sensitively controlled in accordance with the minutest variation in the contour of the die and its angulations. Such control of raising and lowering of the elevator is wholly independent of the backward and forward movement of the carriage, but the travel of the carriage obviously may be concurrent and simultaneous with the elevation and descent of the elevator, as dictated by the contour of the die and its spring bar.

The means described for maintaining the stretch facility in line with the work, part or object, may also be applied to the end opposite to that referred to.

It will be noted that in the diagrammatic wiring view, the switch levers A and B are shown in the electrical circuit as single means that may be moved by the plungers 131 and 132 and 133 and 134, and controlled by the bar 121 to open and close the four circuits to the solenoids 142 and 143, and 166 and 167. The illustration is in this manner for clarity and slightly different from the construction shown in Figs. 22, 23 and 24, but accomplishing the same purpose.

As hereinbefore stated, the application and maintenance of pressure upon an area of the object under treatment is progressive, that is, the pressure applying means are sequentially brought into play. The operation of the stretch facility, that is, the chucks, is immediately successive to the application and maintenance of pressure to and on a previously stretched area. The completed product, therefore, represents a part stretched evenly throughout its length, with substantially no cross-sectional change, and hence free from the disadvantage of weakness, of malformation and the tendency to excessive spring-back.

Inasmuch as the performance of the steps of progressively subjecting limited areas of the part or object to stretch and pressure must be regulated with accuracy, and it is desirable to eliminate as much as possible the human factor in the consecutive operation of these steps, the entire instrumentation is under automatic electrical control, represented in Fig. 31, and described as follows, it being understood that the automatic arrangement includes all of the pressure cylinders, whatever their number, and that the illustration of but three pressure cylinders in the system is exemplary merely.

In a circuit M powered by input lines N through switch D, is a switch 201, arranged to close the circuit to and energize a solenoid 202, which moves the switch arm 203 of a lever 214 linked to said solenoid, against a contact 204. Thereby the solenoid 205 is energized and the stem of said solenoid, being connected to a valve 206, in the chamber R opens said valve, whereby pipe line 207 receives fluid under pressure from the source hereinbefore referred to, and conveys it to the cylinder 29a, the piston of which is forced down to press and hold the plates carried by the shoes against the object disposed between said plates and the die, as previously set out. Connected to the pipe line 207 is a cylinder H housing a spring-pressed piston having a rod projecting therefrom, on the end of which is provided an abutment 208. This abutment is normally disposed in the path of a pivoted lever 209, the arm 209' of which, when pressed against a contact 210, as said lever is moved by the abutment 208, energized the solenoid 211. This solenoid, being connected to the stem of a valve 212, in a chamber S moves said valve 212 down, admitting thereby fluid under pressure to the line 213, which results in the operation of the piston in the cylinder 29b, downwardly, and the application of pressure through the piston rod, shoes and plates, to an area of said object immediately adjacent to and contiguous with the area previously subjected in like manner. At the same time, an abutment 208' on the underside of the piston rod of the cylinder H engages the switch lever 214 and, rotating it, moves the arm 203 out of engagement with the contact 204, thereby de-energizing solenoid 205 and permitting the valve 206 to return to neutral or closed position, thus maintaining the piston rod and its shoes and plates under pressure against the object. At the same time, the switch lever 214 moves a switch lever 215 against a contact 216, to energize the solenoid 217, the stem of which is connected to one end of a valve 218 which is thereby opened. The valve 218 which is included in a high pressure fluid circuit, thus admits fluid under pressure to line 219, which connects with the stretch cylinder 94 or 71, at one side of the piston therein. The piston rod 95 connected to the piston of the cylinder 94 carries the chuck 96 that grips the end of the part 76 and, moving to the right as view in Fig. 1, begins the operation of stretching the area of the part 76, that is not being held by any of the pressure-exerting piston rods and shoes.

Connected to the pipe line 213, is a cylinder I housing a spring-pressed piston, and having a rod projecting therefrom, on the end of which is provided an upper and a lower abutment 220 and 220', respectively. When the line 213 is supplied with fluid pressure the piston in said cylinder I is actuated and thereby the upper abutment 220 rotates a pivotally mounted lever 221, to bring the arm 221' thereof into engagement with the contact 222. The lever 221 has a notch at the rear side thereof, that is adapted to be engaged by a spring-pressed pawl 230 to hold the lever 221 in place, and simultaneously energize the solenoid 223. The solenoid being connected by a stem to the lower part of the valve 224, the said valve, which is housed in a chamber T is thereby opened. The resulting flow of fluid under pressure through pipe line 225, entering the cylinder 29c, forces down the piston therein, and thereby the piston rod thereof exerts pressure up another limited area of the part or object.

The lower abutment 220' of the piston rod, projecting from the cylinder I, on its movement away from said cylinder I, engages the end of the lever 238 and moves it to engage the contact 239. Thereby the solenoid 240 is energized. The stem of this solenoid is provided with a pawl 241 that is adapted to engage in a notch in the rear side of the lever 209 to hold it against movement periodically, and the arm 209' thereof, in engagement with the contact 210, as before explained. When, therefore, the solenoid 240 is energized, the pawl 241 is withdrawn from the notch of the lever 209, which under spring tension removes the arm 209' thereof from the contact 210, thereby de-energizing the solenoid 211, and moving the valve 212 to closed or neutral position. The piston rod projecting from the cylinder I also moves the lever 235 against the contact point 236 which energizes the solenoid 237 and returns the lever 238 to original open position.

The pressure regulator J, the cylinder of which is provided with a piston, has a piston rod 226. On the bottom of this piston rod is an abutment 226' that lies in the path of the rotative movement of a lever 227, which thereby moves the arm 227' of said lever to engagement with a contact 228. The solenoid 229 is thereby energized and the pawl 230 withdrawn from the lever 221. The switch lever 221 thereupon under the tension of a spring breaks contact with the point 222, thereby de-energizing the solenoid 223 and permitting the valve 224 to return to closed or neutral position under the pressure of spring 231, contained in the cylinder thereof. The forward end of the piston rod 226 associated with the cylinder J, in its forward travel presses the switch lever 232 against the contact 233, thereby energizing solenoid 234 and returning the switch lever 227 to original position.

Simultaneously, with the initiation of the stretch operation, an insulated contact point 242 on the end of a rod, associated with the piston in the stretch cylinder 94, and extending ahead of said cylinder, is moved against a switch lever 243, thereby energizing a motor 244 and its gear arrangement 245 for regulating the pressure in the stretch cylinder 94. The increase in cylinder pressure for obtaining the increase in stretch tension required for tapered parts or object having a variable cross-section, is thereby initiated. When the maximum elongation measured by the travel of the stretch-chuck 96 has been attained, the raising lever 246, through multiplicate linkage, opens and closes three switches simultaneously, as follows:

(1) The lever 247 is disengaged from the contact 248. This disengagement opens the switch circuit of lever 243, thereby de-energizing the motor 244 and halting the increase of pressure to the stretch facilities.

(2) The lever 249 is removed from contact 250, whereby the switch circuit 215—216, which de-energizes the stretch cylinder solenoid 217 and thus permits the valve 218, which controls the travel of the fluid under pressure to the stretch cylinder 94, to return to closed position, and inhibiting further movement of the stretch chuck 96.

(3) The switch lever 252 engages the contact 251, thus energizing all the solenoids 253, 254, and 255. The respective valves in chambers R, S and T are thereby opened and the respective pipe lines 256, 257 and 258 are then charged with the fluid under pressure from the source. This pressure thereby raises the pistons in the cylinders 29a, 29b, and 29c. When the piston in cylinder 29a reaches substantially the end of its travel, the rod 259a, that is provided on the piston and projects through and beyond the upper end of the cylinder engages and moves a switch 260 from contact with the point 261, thereby de-energizing solenoid 253. The valve 206 thereupon, under spring pressure returns to neutral or normal position.

The operation of the rods 259b and 259c, relative to the switch lever 262 and 263, and solenoids 254 and 255, is identical with the operation explained above in connection with cylinder 29a, and therefore needs no further description.

Switches 264, 265, and 266 are manually operated to control solenoids 205 and 253, 211 and 254 and 223 and 255, respectively, whereby the respective valves 206, 212 and 224 are controlled.

A manually operable switch 267 controls energization of solenoid 268 and also of solenoid 217. These solenoids operate the valve in chamber 118 by which the passage of fluid under pressure is admitted to the stretch cylinder 94 or 74, and, as stated, are under the control of the manual switch 267.

Manual controls are essential to the preliminary test and performance of the apparatus before initiating the automatic operation of the system.

What I claim is:

1. Means for stretch-forming metal objects to the contour of a die, including such die, a support for same, means for gripping the respective ends of the object, a carriage for each of said gripping means, fluid-pressure means on said carriages to operate said gripping means to subject the object to tension, a cross-head, means for raising and lowering said cross-head, a plurality of cylinders on said cross-head having piston rods projecting therefrom, a plurality of shoes connected with said rods, a plurality of plates carried by said shoes and means for progressively admitting fluid under pressure to said cylinders to subject the shoes and plates to pressure on successive tensioned areas of the object.

2. Means for stretching metal object and simultaneously shaping same to and over the contour of a die, including such die, clutch means for gripping the respective ends of the object and holding the object in tensioned relation and in proximity to the die, a plurality of superposed plates equal in length substantially to the length of the object, a plurality of shoes in which said plates are carried, said shoes being pivotally interconnected and susceptible of independent relative movement, means for progressively exerting pressure on said shoes and plates carried thereby progressively to form limited areas of the tensioned object to the contour of the die, and means to actuate the clutch means to stretch-tension the object in continuous stages following the application of pressure.

3. A machine for forming and stretching metal parts, comprising a die, a support for said die, a plurality of alined shoes above the part to be formed, a plurality of alined piston rods and cylinders, means for supporting said cylinders and piston rods, means connecting said shoes with said piston rods for universal movement thereof, a carriage at each end of said support, one of said carriages being movable longitudinally of said support, and the other of said carriages being movable transversely of said support, a carrier in each of said carriages, gripping means pivoting on each carrier and adapted to clutch the respective ends of the part to be formed and to hold same in tension above the die, fluid pressure means to operate said piston rods of the alined cylinders and the shoes to exert pressure upon areas of the part contiguous with said shoes successively and progressively to form and retain them to the contour of the die, fluid pressure means to operate one of said clutch means successively and progressively to stretch the area of the part not under pressure, means to hold the other of said clutch means immovable during such stretching operation, fluid pressure means to move the carrier for said one of the gripping means for applying pressure against the part to maintain the part in proximity to the die, and fluid pressure means to move the carriage and the carrier thereof transversely independently of the gripping means movement thereof to insure the stretch of the part in a longitudinal plane.

4. A machine for stretch forming metal objects, including a die, clutch means for gripping the respective ends of the object, means to move said clutch means to subject the object to an initial tension and hold same in proximity to the surface of said die, a plurality of shoes, a series of superposed plates carried by said shoes and of a length substantially equal to the length of the die, means to operate said shoes and the plates carried thereby in sequence progressively to press and hold limited areas of the tensioned object against the die to form same progressively to limited areas of the die, and means progressively to stretch the area of the object not held against the die immediately following the subjection of the preceding area to pressure.

5. A device for forming metal objects including a die, gripping elements for the respective ends of the object, means to operate said gripping elements to stretch the object and hold same stretched above the die, a plurality of shoes, fluid pressure means to operate said shoes progressively to press and hold limited stretched areas of the object against the die, carriers for said gripping elements and means to move at least one of said carriers perpendicularly and transversely relative to the die, to maintain the gripping and stretching element thereof substantially tangent to the die contour.

6. A device for stretch-forming metal objects, including a die, a support for same, clutch means for gripping the respective ends of and holding the object above the die, a pair of carriers, carriages on said support in which said carriers are slidable, said clutch means being pivotally mounted on said carriers, a plurality of shoes, pistons to which said shoes are connected operable to press said shoes progressively and sequentially against limited areas of said object to hold same against the die, means to move one of said clutching means successively and progressively to stretch the area not under pressure, means to move one of said carriages transversely to insure the stretch of the object in a straight line, and means to move the carrier of said carriage perpendicularly and independently of the transverse movement to maintain the object in proximity to the die contour during the progressive formation of the object in conformity with the die.

7. A device for stretching a metal body and simultaneously shaping it to the contour of a die including a support, a die on said support, clutch means for gripping the respective ends of the body and holding same in relative proximity to the die, a plurality of shoes mutually interlocked and movable relative to each other, a series of superposed plates carried by said shoes and disposed in relative proximity to said body, a plurality of cylinders having piston rods, said shoes being connected with said rods for universal movement relative thereto and said piston rods being operable by fluid-pressure in progressive sequence to subject limited areas of the plates to pressure for pressing, forming and holding limited and stretched areas of the body against the die, and means for moving at least one of said clutch means to stretch the area of the body not under pressure.

8. A device for stretching a metal body and substantially simultaneously shaping it to the contour of a die, including a support, a die on said support, clutch means for gripping the respective ends of the body and holding same tautened in proximity to the die, a plurality of shoes mutually interlocked and movable relative to each other, a series of superposed plates carried by said shoes and disposed in relative proximity to said body, fluid pressure operated means connected with said shoes to subject said plates to pressure progressively against limited areas of the body and form and hold same to the contour of the die, means to move at least one of said clutch means continuously to stretch the area of the die not held by said plates, and means to hold the interlocked shoes in place during the stretching operation.

9. In a machine of the character disclosed, a series of cylinders having pistons and piston rods, a shoe connected to each of said piston rods, a series of plates carried by said shoes, a die, a support for same, a carriage horizontally movable on said support, an elevator housed in and movable vertically relatively to said carriage, a chuck carried by said elevator for gripping an end of a part and stretching same, fluid pressure means to operate said piston rods sequentially to press said plates against adjacent portions of the part to be stretched and hold same against limited areas of the die, fluid pressure means to operate said chuck to stretch the portion of the object not under pressure, fluid pressure means to move said carriage transversely, fluid-pressure means to move said elevator vertically, electrically operated valve means to govern said fluid pressure for operating said carriage and elevator, and means governable by the contour of the die to control said electric means.

10. In a machine for stretch-forming objects, a die having a longitudinal groove in the face thereof, a bar adapted to fit in said groove, a plurality of juxtaposed cylinders having pressure applying shoes, a pair of chucks for gripping and holding the ends of the part to be formed in proximity to the die, fluid pressure means to operate said shoes progressively to press and hold limited areas of the part against the die and simultaneously press said bar in the groove, and means controllable by said bar to maintain at least one of said chucks in alinement with the part.

11. In a machine for stretch-forming metal objects, a die having a longitudinal groove in the face thereof, a spring bar adapted to fit into said groove, a plurality of alined cylinders having piston rods and shoes, chucks for gripping and holding the ends of a part to be formed and stretched in proximity to the die, a mount for said chuck, fluid pressure means to operate said piston rods and shoes to subject limited areas of the part to pressure and hold same against the die and simultaneously press said bar progressively into said groove, fluid pressure means to operate said chuck continuously progressively to stretch the area of the part not being held, electrical means to control the fluid pressure means whereby the stretch operation follows the application of the holding pressure, and fluid pressure means to move said mount for said chuck in any direction to maintain the alinement of the chuck with the part, said means being controllable by said bar.

12. In a machine for stretch-forming metal objects, a die having a longitudinal groove in the face thereof, a pair of chucks for gripping and holding the ends of a part to be formed, a plurality of cylinders having pressure applying shoes, fluid pressure means for operating said shoes progressively to press and hold the part against said die, fluid pressure for operating one of said chucks to stretch the area of said object not being held, a mount for said chuck, fluid pressure means to move said mount and thereby maintain the alinement of the chuck with the object, electrical means for controlling said fluid pressure means, and a spring bar adapted to be progressively pressed into said groove to energize said electrical means.

13. In a machine for stretch-forming metal objects, a die having a longitudinal groove in the face thereof, a bar adapted to fit in said groove, a pair of chucks for gripping and holding the ends of an object in proximity to said die, a plurality of cylinders having pressure applying shoes, fluid pressure for operating said shoes progressively to press and hold limited areas of the object against said die and simultaneously press said bar into said groove, fluid pressure means for operating one of said chucks to stretch the area of the object not being held, a mount for said chuck, fluid pressure means to move said mount to maintain the chuck in alinement with the object, and electrical means controllable by said bar to govern the operation of said fluid pressure.

14. In a machine for stretch-forming metal objects, a die having a groove in the face thereof, a pair of chucks for gripping and holding the ends of an object in proximity to the die, a plurality of fluid pressure operated shoes progressively to press and hold limited areas of the object against said die, fluid pressure means for operating one of said chucks to stretch the area of the object not being held, a mount for said chuck, fluid pressure means to move said mount to maintain the direction of stretch in line with the object, valves to control said fluid pressure means, and means adapted to be pressed into the groove of said die by the shoes simultaneously with the pressing of the object against the die for controlling the operation of said valves.

15. In a machine for stretch-forming metal objects, a die, a pair of chucks for gripping and holding the ends of an object in proximity to the die, a plurality of shoes, fluid pressure means to operate said shoes progressively to press and hold limited areas of the object against said die, fluid pressure means for operating one of said chucks to stretch the area of the object not being held, a mount for said chuck, fluid pressure means to move said mount to maintain the direction of stretch in line with the object, valves to control said fluid pressure means and means controllable by the contour of the die to govern the operation of said valves.

16. A method of making a component of tapering cross-section by stretching and forming from aluminum and other metal stock having similar working characteristics and which is in the form of a sheet or slab, comprising the steps of: utilizing stock having a cross-sectional area varying progressively along a given dimension, holding the stock at the end of said dimension having the larger cross-section and applying stretch therefrom along progressively decreasing lengths of said dimension, and determining said lengths by forming the stock independently of said stretching by clamping it progressively along said dimension toward the end from which said stretch is effected, in order to obtain substantially uniform extension of the stock along said dimension.

17. A machine for making a component of tapering cross-section by stretching and forming from aluminum and other metal stock having similar working characteristics and which stock is in the form of a sheet having a cross-sectional area which varies progressively along a given dimension, comprising a holding element for application to the stock at one end of said dimension, combined forming and clamping elements arranged for cooperation upon opposite side faces of the stock along said dimension successively at a number of points at progressively decreasing distances from said holding element, means causing relative movement between said combined forming and clamping element and said holding element along said dimension to stretch the progressively reducing lengths of stock held by said holding element and extending between said combined forming and clamping element thereby effecting a substantially equal extension to said stock per unit of length along said dimension.

References Cited in the file of this patent

UNITED STATES PATENTS

| | | |
|---|---|---|
| 1,156,062 | Crellin | Oct. 12, 1915 |
| 1,264,248 | Yoder | Apr. 30, 1918 |
| 1,431,175 | Ogden | Oct. 10, 1922 |
| 1,968,010 | Bailey | July 31, 1934 |
| 2,269,549 | Oeckl | Jan. 13, 1942 |
| 2,334,520 | Walters | Nov. 16, 1943 |
| 2,347,575 | Neverdal | Apr. 27, 1944 |
| 2,379,658 | Saunders | July 3, 1945 |
| 2,431,173 | Hawkes | Nov. 18, 1947 |
| 2,446,089 | Hochreiter | July 27, 1948 |
| 2,553,092 | Hubbert | May 15, 1951 |

FOREIGN PATENTS

| | | |
|---|---|---|
| 2,767 | Great Britain | Sept. 18, 1872 |

OTHER REFERENCES

Pages 37, 38, 39 and 43 of "Principles of Stretch-Wrap Forming," copyrighted in 1950, by Hufford Machine Works, Inc.